(12) United States Patent
Humer et al.

(10) Patent No.: US 8,657,379 B2
(45) Date of Patent: Feb. 25, 2014

(54) POWER RETURN FOLDING HEAD RESTRAINT

(75) Inventors: Mladen Humer, West Bloomfield, MI (US); Arjun Yetukuri, Rochester Hills, MI (US); Gerald Steven Locke, Lake Orion, MI (US); Jasmine Pizana, Scottville, MI (US)

(73) Assignee: Lear Corporation, Southfield, MI (US)

( * ) Notice: Subject to any disclaimer, the term of this patent is extended or adjusted under 35 U.S.C. 154(b) by 24 days.

(21) Appl. No.: 13/532,102

(22) Filed: Jun. 25, 2012

(65) Prior Publication Data

US 2013/0341987 A1    Dec. 26, 2013

(51) Int. Cl.
*A47C 7/36*      (2006.01)

(52) U.S. Cl.
USPC ........................................................ 297/408

(58) Field of Classification Search
USPC ......................................... 297/408, 409, 391
See application file for complete search history.

(56) References Cited

U.S. PATENT DOCUMENTS

| | | | |
|---|---|---|---|
| 5,054,856 A * | 10/1991 | Wang | 297/408 |
| 5,669,667 A * | 9/1997 | Schmidt | 297/408 |
| 6,942,292 B2 * | 9/2005 | Low et al. | 297/216.12 |
| 7,243,996 B2 * | 7/2007 | Daniels | 297/378.12 |
| 7,320,501 B2 | 1/2008 | Keyser et al. | |
| 7,441,821 B2 | 10/2008 | Yetukuri et al. | |
| 7,556,306 B2 | 7/2009 | Yetukuri et al. | |
| 7,717,516 B2 | 5/2010 | Sutter, Jr. et al. | |
| 8,152,242 B2 | 4/2012 | Yetukuri et al. | |
| 8,157,328 B2 | 4/2012 | Brunner et al. | |
| 2008/0290713 A1 * | 11/2008 | Oda | 297/408 |
| 2010/0283306 A1 * | 11/2010 | Boes et al. | 297/408 |
| 2011/0137529 A1 | 6/2011 | Locke et al. | |

* cited by examiner

*Primary Examiner* — Milton Nelson, Jr.
(74) *Attorney, Agent, or Firm* — Brooks Kushman P.C.

(57) ABSTRACT

A head restraint assembly includes a post assembly which has a first post section, a second post section, and a cross member section connecting the first post section and the second post section. The first post section and the second post section are adapted to engage a vehicle seat. The head restraint includes a bun moveably attached to the post assembly, a first gear, and a motor that rotates the first gear in a clockwise or counter-clockwise direction. Rotation of the first gear drives a second gear which drives a third gear. Rotation of the second gear in a first direction causes movement of the bun to a tilted position while movement of the second gear in a second direction causes movement of the bun to an upright position.

20 Claims, 4 Drawing Sheets

POWER RETURN FOLDING HEAD RESTRAINT

FIELD OF THE INVENTION

In at least one aspect, the present invention relates to systems for moving a head restraint between an upright and a tilted position.

BACKGROUND

Competitive pressure places a persistent demand on automobile manufacturers and suppliers to improve aesthetics and functionality of vehicle components. Head restraints are automobile interior components having the important function of providing support for a vehicle occupant's head during an accident.

In the many vehicular head restraint assemblies, a bun is moveably attached to a vehicle seat by one or more posts. Characteristically, head restraints are positionable in either an upright or folded position. In the typical head restraint, such positioning is manually accomplished by a vehicle occupant. Although the positioning mechanism work reasonably well, some head restraint positioning mechanisms occasionally experience "chuck" which is a noise produced by moveable component vibrating and contacting each other. Moreover, users of higher end vehicles often desire automated systems for moving automobile interior components.

Accordingly, there exists a need for improvements to the prior art head restraint designs that allow improved positionability.

SUMMARY OF THE INVENTION

The present invention solves one or more problems of the prior art by providing in at least one embodiment an electrically powered return-folding head restraint assembly. The head restraint assembly includes a post assembly which has a first post section, a second post section, and a cross member section. The cross member section connects the first post section and the second post section. The first post section and the second post section are adapted to engage a vehicle seat. The head restraint also includes a bun moveably attached to the post assembly, a first gear, and a motor that rotates the first gear in a clockwise or counter-clockwise direction. Rotation of the first gear drives a second gear. A third gear is concentrically fixed to the second gear. A fourth gear is fixed to the cross member and engages the third gear such that rotation of the third gear in a first direction causes movement of the bun to a folded and/or tilted position while movement of the third gear in a second direction causes movement of the bun to an upright position. Characteristically, the first gear, the second gear, the third gear, and the motor are positioned internally within the bun.

In another embodiment, an electrically powered return-folding head restraint assembly is provided. The head restraint assembly includes a post assembly which has a first post section, a second post section, and a cross member section. The cross member section connects the first post section and the second post section. The first post section and the second post section are adapted to engage a vehicle seat. A head restraint bun is moveably attached to the post assembly and a support structure is positioned within the bun with the cross member mounted therein such that the support structure is moveable between an upright and folded/tilted position. The support structure has a first support section and a second support section that are attached together. The head restraint assembly also includes an electrically powered drive mechanism. The electrically powered drive mechanism includes a worm, an electric motor that rotates the worm in a clockwise or counter-clockwise direction, a spur gear that is driven by rotation of the worm, a first helical gear that is concentrically fixed to the spur gear, and a second helical gear fixed to the cross member. The spur gear is rotatably mounted on a first support section of the support structure. Characteristically, rotation of the second helical gear in a first direction causes movement of the bun to a tilted/folded position while movement of the second helical gear in a second direction causes movement of the bun to an upright position.

In another embodiment, an electrically powered return-folding head restraint assembly is provided. The head restraint assembly includes a post assembly which has a first post section, a second post section, and a cross member section. The cross member section connects the first post section and the second post section. The first post section and the second post section are adapted to engage a vehicle seat. A head restraint bun is moveably attached to the post assembly and a support structure is positioned within the bun with the cross member mounted therein such that the support structure is moveable between an upright and folded/tilted position. The support structure has a first support section and a second support section that are attached together. The head restraint assembly also includes an electrically powered drive mechanism. The electrically powered drive mechanism includes a first gear, an electric motor that rotates the first gear in a clockwise or counter-clockwise direction, a second gear that is driven by rotation of the first gear, a third gear that is concentrically fixed to the second gear, and a fourth gear fixed to the cross member. The second gear is rotatably mounted on the first support section of the support structure. Rotation of the third gear in a first direction causes movement of the bun to a folded position while movement of the third gear in a second direction causes movement of the bun to an upright position. The first gear is angled with respect to the second gear with an angle $A_1$. Angle $A_1$ is equal to 90 degrees minus $A_2$ where $A_2$ is the angle between an axis of rotation for the first gear and an axis of rotation for the second gear. $A_1$ is from about 0 degrees to about 30 degrees. Characteristically, the first gear, the second gear, the third gear, fourth gear, and the electric motor are continuously engaged such that chuck is advantageously reduced.

DESCRIPTION OF THE INVENTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
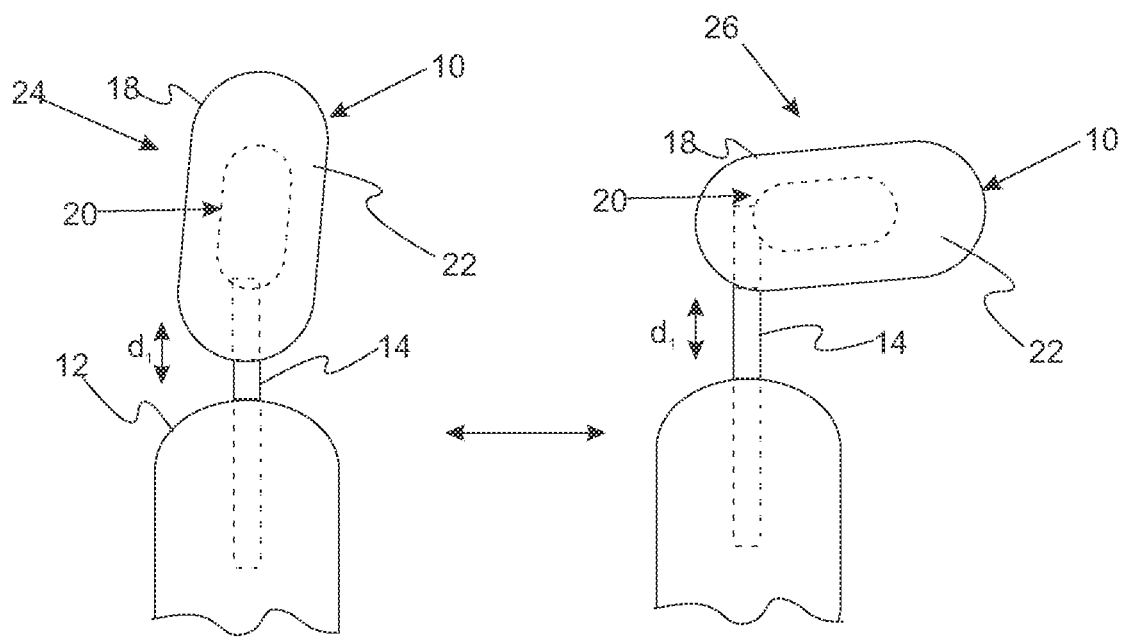
FIG. 1 is a schematic illustration showing movement of an electrically powered head restraint assembly.
Figure 2:
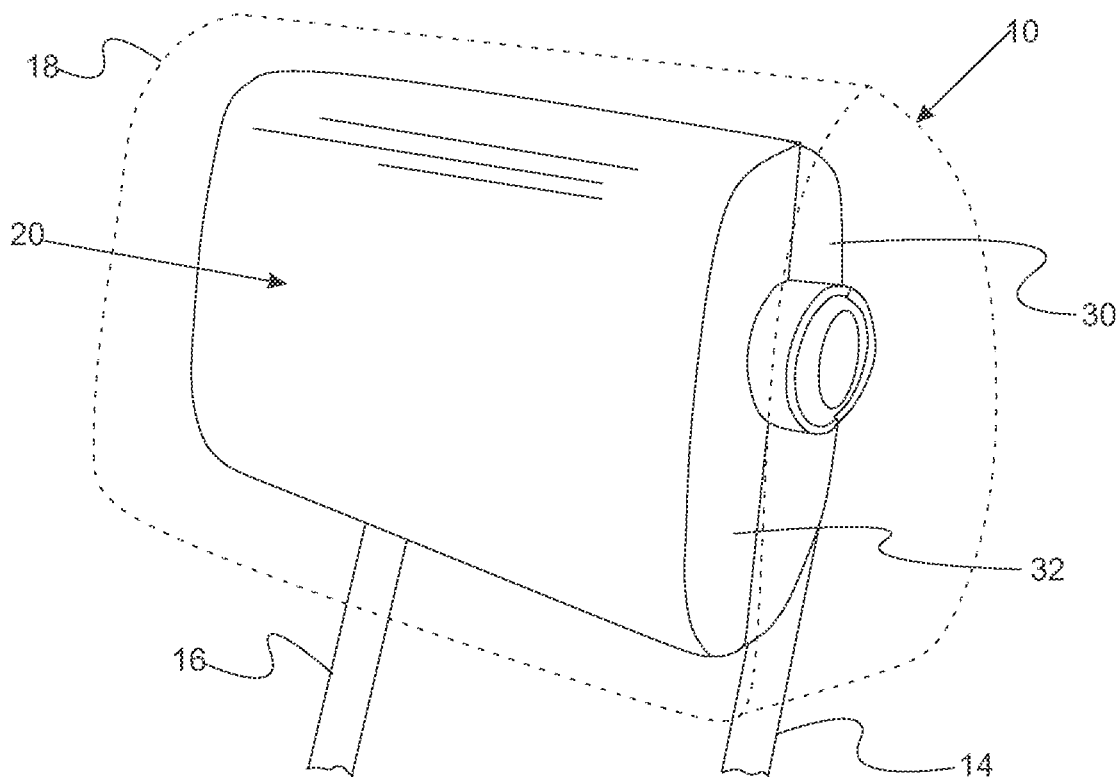
FIG. 2 is a perspective view of a head restraint shell that holds an electrically powered drive mechanism for the head restraint assembly of FIG. 1.

In at least one aspect, a power return-folding head restraint assembly is provided. Referring to FIGS. 1 and 2, head restraint assembly 10 is attached to seat back 12 which extends from a seat bottom. The seat bottom may be secured to a floor of an associated vehicle for seating an occupant upon the seat bottom. The seat back 12 can be secured relative to the seat bottom for supporting a back of the occupant against the seat back 12. The seat back 12 may pivot relative to the seat bottom to permit ingress and egress to and from a rear seating row and/or to permit an occupant to select a comfortable riding position while sitting in the vehicle seat.

Head restraint assembly 10 is mounted to seat back 12 via support rods 14, 16. In a refinement, support rods 14, 16 are moveable relative to the seat back 12 in an upright direction as indicated by $d_1$ to adjust the height of the head restraint assembly 10 relative to the seat back 12. Head restraint bun 18 forms a structure of the head restraint assembly 10. Head restraint bun 18 can support a head of an occupant when the occupant is sitting on the vehicle seat. In a refinement, head restraint bun 18 includes support structure 20 which is also referred to as a shell. In a further refinement, bun 18 includes foam 22 (e.g., a resinous foam) in which support structure 20 is embedded. It should be appreciated that head restraint bun 18 may have any size and shape desired. The head restraint assembly 10 is pivotally attached to the support rod 16 so that the head restraint assembly 10 is moveable between upright position 24 and tilted position 26 (included the folded position). It should be appreciated that the head restraint assembly 10 is positionable in any number of intermediate positions between the upright and folded positions. Ina refinement to accomplish this goal, an optional rotational encoder that could limit the end rotation conditions and serve as a memory feature for tilt position may be utilized. An electrically powered drive mechanism which accomplishes this movement is positioned within support structure 20. Support structure 20 includes first support section 30 and second support section 32 which allow for the electrically powered drive mechanism to be mounted before incorporation into head restraint assembly 10. First support section 30 and second support section 32 are combined together after placement of the electrically powered drive mechanism to form support structure 20. Typically, support structure 20 is a molded plastic although metal may also be used. The details of this electrically powered drive mechanism are set forth below.

Figure 3:
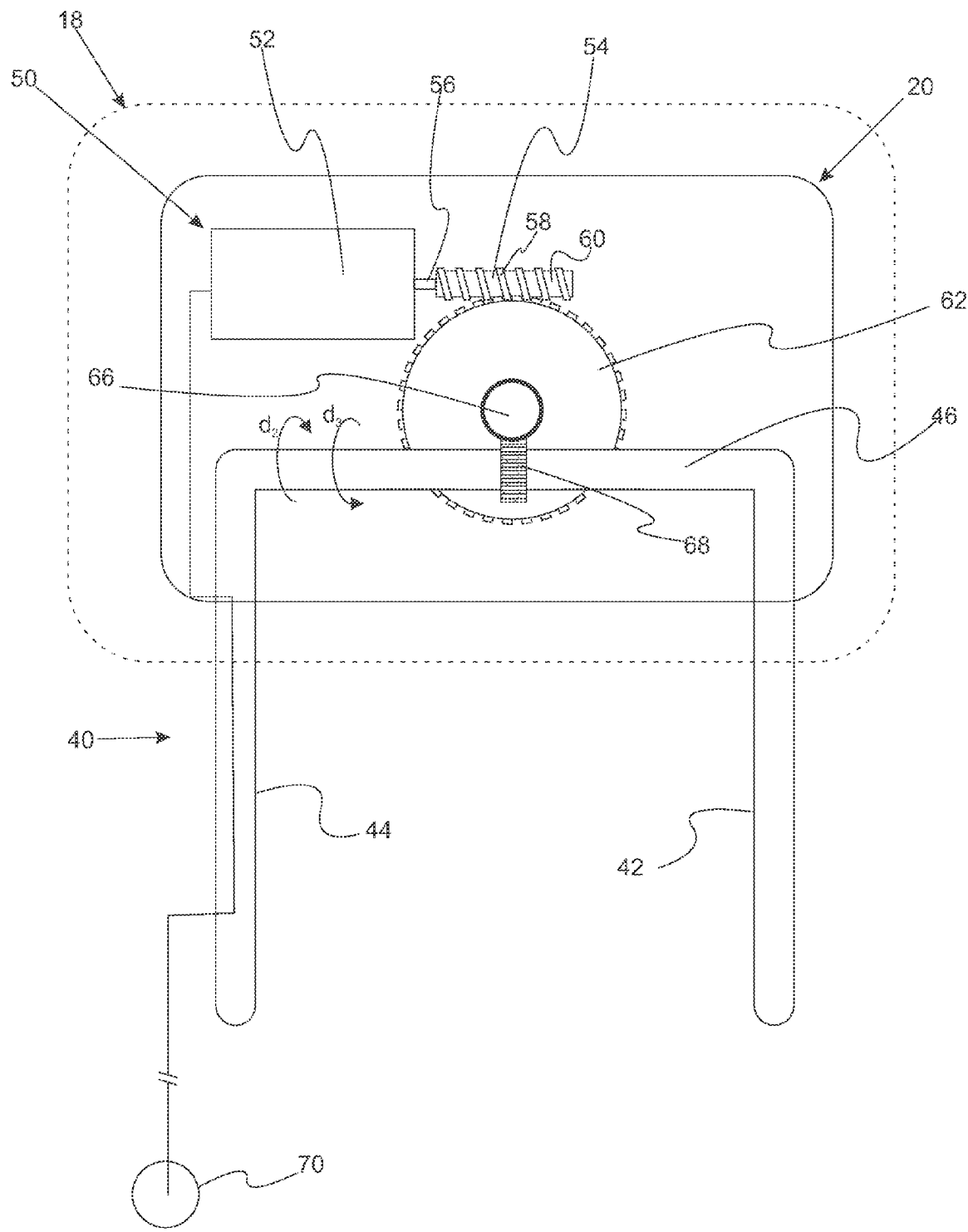
FIG. 3 is a schematic front view of an electrically powered head restraint driver mechanism mounted with a head restraint shell.
Figure 4A:
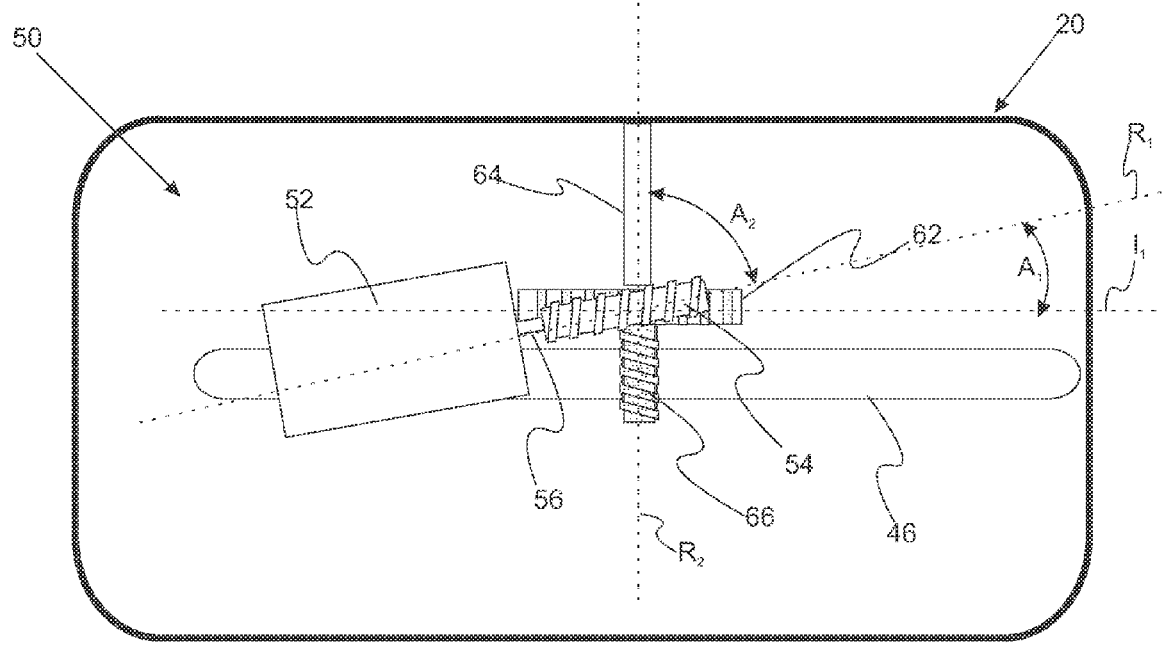
FIG. 4A is a schematic top view of an electrically powered head restraint driver mechanism mounted with a head restraint shell.
Figure 4B:
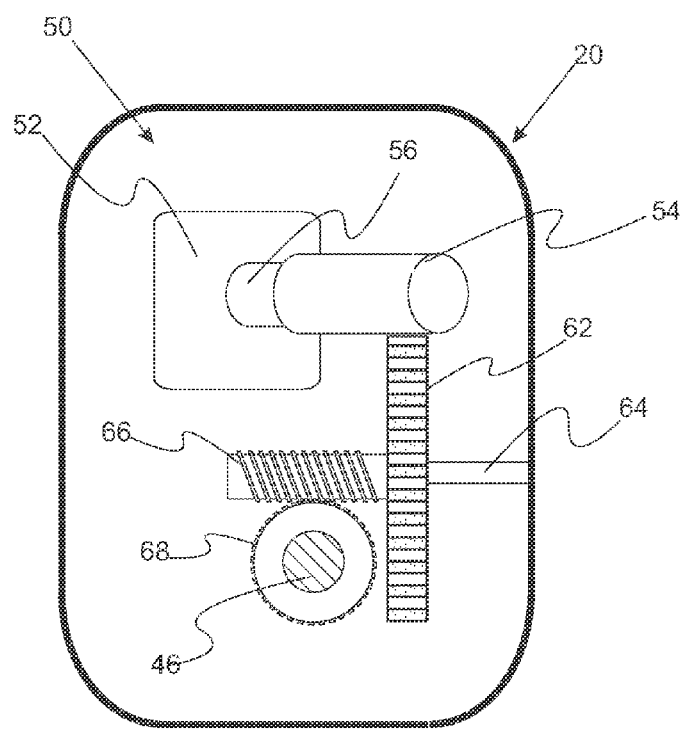
FIG. 4B is a schematic side view of an electrically powered head restraint driver mechanism mounted with a head restraint shell.

With reference to FIGS. 3, 4A and 4B, a schematic illustration of an electronically operated drive mechanism for moving a head restraint between the tilted (including the folded position) and upright position is provided. FIG. 3 is a schematic front view of an electrically powered head restraint driver mechanism mounted with a head restraint shell. FIG. 4A is a schematic top view of an electrically powered head restraint driver mechanism mounted with a head restraint shell. FIG. 4B is a schematic side view of an electrically powered head restraint driver mechanism mounted with a head restraint shell. Post assembly 40 is mounted within support structure 20. Post assembly 40 includes first post section 42, second post section 44, and cross member section 46. Cross member section 46 connects first post section 42 and second post section 44. First post section 42 and second post section 44 are adapted to engage a vehicle seat. First post section 42 and second post section 44 function as support rods 14 and 16 in FIGS. 1 and 2. Support structure 20 is rotatable along directions $d_2$ and $d_3$ about cross member section 46.

Still referring to FIGS. 3, 4A, and 4B, drive mechanism 50 is mounted within support structure 20 and includes electric motor 52 which is mounted in support structure 20. D.C. motor 52 rotates in both a first direction and a second direction (i.e., clockwise and counter-clockwise). Typically, electric motor 52 is a direct current (D.C.) motor. Gear 54 is mounted on shaft 56 of electric motor 52. In a refinement, gear 54 is a worm or a helical gear. The term "worm" as used herein refers to a threaded gear which is similar to a screw. In a refinement, gear 54 is a worm that is singly or multi-start/threaded (e.g., double start or triple start). Threads 58 of gear 54 circles around central shaft 60. Gear 54 engages and drives gear 62 while gear 54 is rotating. Gear 62 is mounted on support structure 20 via shaft 64. Gear 62 also is rotatable in two directions depending on the rotation of gear 54. In a refinement, gear 62 is a worm-gear or a helical gear. Gear 66 is concentrically fixed to gear 62 and therefore rotates in the same sense (clockwise or counter-clockwise) as gear 62. In a refinement, spur gears and helical gears are particularly useful selections for gear 62. Gear 66 engages and meshes with gear 68. Gear 68 is fixed to cross member 46 such that rotation of the gear 66 in a first direction causes movement of bun 18 to a tilted (including the folded position) position while movement of gear 66 in a second direction causes movement of bun 18 to an upright position. In a refinement, gear 68 is a spur gear or a helical gear. Characteristically, gear 54, gear 62, gear 66, gear 68, and electric motor 52 are positioned internally within the bun. One skilled in the art will readily recognize that many different kinds of gears may be utilized for gear 54, gear 62, gear 66, and gear 68 without changing the scope of the present embodiment.

In a refinement, switch 70 is used to actuate electric motor 52. Switch 70 includes two set positions, one for folding the head restraint and one for bringing the head restraint to the upright position. In a further refinement, the head restraint drive mechanism is remotely actuated. Examples of remote actuation of a head restraint are set forth in U.S. Pat. Nos. 7,556,306; 7,441,821; and 8,152,242; the entire disclosures of which are hereby incorporated by reference.

In a refinement, gear 54 is angled with respect to gear 62 in the sense that a longitudinal line through the axis of rotation $R_1$ for gear 54 is at an angle $A_1$ with respect to line $l_1$ which is perpendicular to the axis of rotation $R_2$ of gear 62. Alternatively, this angle is defined by the angle $A_2$ between the axis of rotation $R_1$ for gear 54 and the axis of rotation $R_2$ for gear 62 such that $A_1$ is equal to 90 degrees minus $A_2$. In a refinement, $A_1$ is from about 0 degrees to about 30 degrees. In another refinement, $A_1$ is from about 5 degrees to about 20 degrees. In particular, $A_1$ is about 30 degrees.

Figure 5:
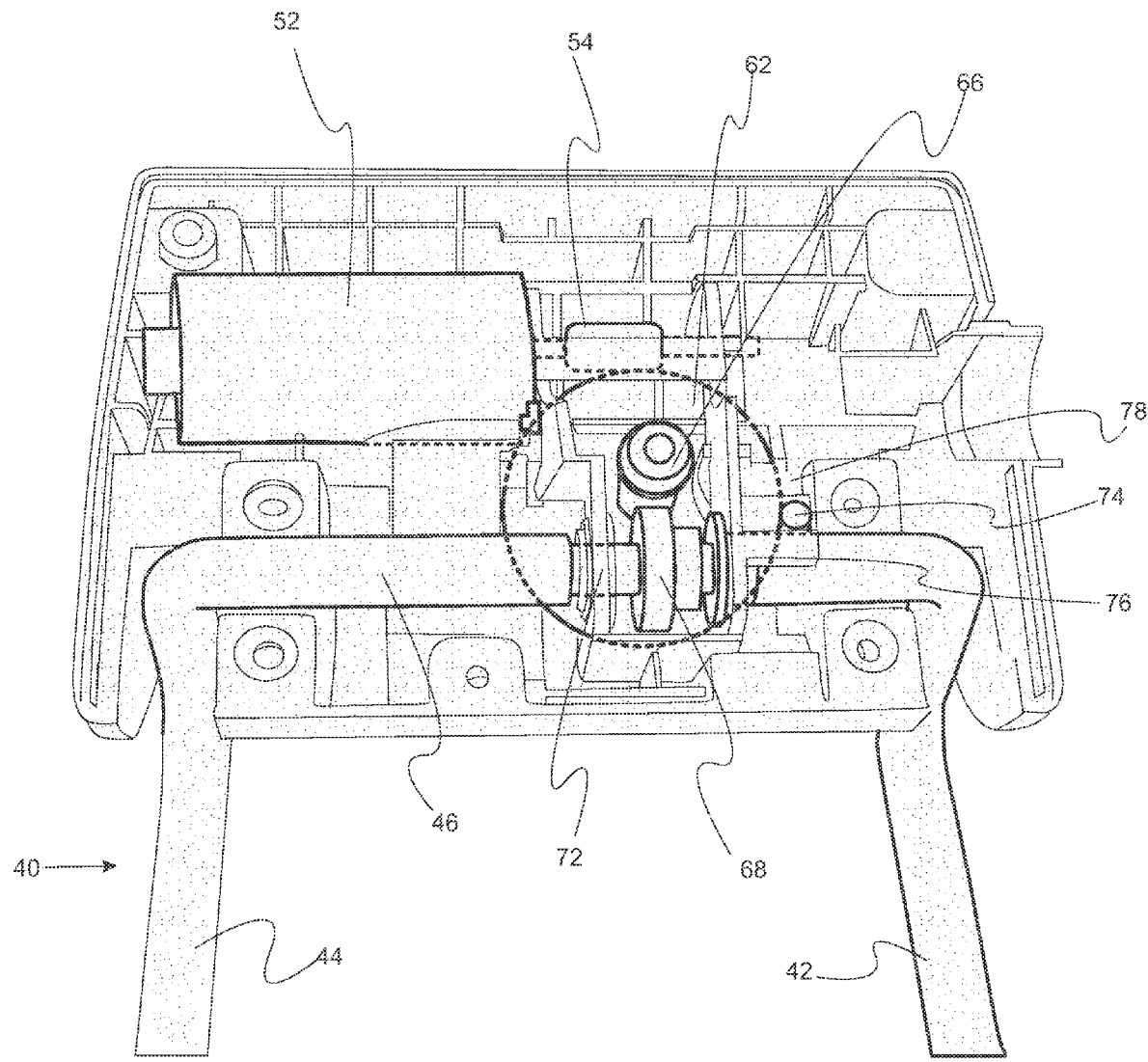
FIG. 5 provides a perspective view illustrating the mounting of the electrically powered head restraint driver mechanism.

With reference to FIGS. 2 and 5, a schematic illustration of a variation in which an electrically powered head restraint driver mechanism is provided. FIG. 5 provides a perspective view illustrating the mounting of the electrically powered head restraint driver mechanism set forth above. As set forth above, the head restraint assembly includes support structure 20. Support structure 20 includes first support section 30 and second support section 32. Electric motor 52, gear 54, gear 62, gear 66, and gear 68 are mounted on support section 30 via bracket 72. In a refinement, second structure section 32 has bracket 72 molded therein. FIG. 5 also illustrates that stop peg 74 is attached to cross member 46. When arriving at the upright position stop peg 74 engages stop 76 which is fixed to first support section 30. This engagement cases electric motor 52 is slip or stall until a user releases the switch thereby holding the head restraint in the upright position. When being actuated to the tilted (including the folded position) position, stop peg 74 engages stop 78 or the set back to stop the motion of the head restraint.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A head restraint assembly comprising:
    a post assembly including a first post section, a second post section, and a cross member section, the cross member section connecting the first post section and the second post section, the first post section and the second post section adapted to engage a vehicle seat;
    a bun moveably attached to the post assembly;
    a support structure positioned within the bun;
    a first gear;
    an electric motor that rotates the first gear in a clockwise or counter-clockwise direction;
    a second gear that is driven by rotation of the first gear;
    a third gear mounted on the second gear; and
    a fourth gear fixed to the cross member and engaging the third gear such that rotation of the third gear in a first direction causes movement of the bun to a tilted position while movement of the second gear in a second direction causes movement of the bun to an upright position, wherein the second gear and the electric motor are mounted on the support structures.

2. The head restraint assembly of claim 1 wherein the first gear is a worm.

3. The head restraint assembly of claim 2 wherein the worm is a multi-start gear.

4. The head restraint assembly of claim 1 wherein the second gear is a spur gear or helical gear.

5. The head restraint assembly of claim 1 wherein the third gear is a worm or a helical gear.

6. The head restraint assembly of claim 1 wherein the fourth gear is a spur gear or helical gear.

7. The head restraint assembly of claim 1 wherein the electric motor is actuated by a user operated switch.

8. The head restraint assembly of claim 1 wherein the electric motor is remotely actuated.

9. The head restraint assembly of claim 1 wherein the first gear, the second gear, the third gear, fourth gear, and the electric motor are continuously engaged.

10. The head restraint assembly of claim 1 wherein the first gear is angled with respect to the second gear with an angle $A_1$, $A_1$ being equal to 90 degrees minus $A_2$ where $A_2$ is the angle between an axis of rotation for the first gear and an axis of rotation for the second gear, $A_1$ being from about 0 degrees to about 30 degrees.

11. A head restraint assembly comprising:
    a post assembly including a first post section, a second post section, and a cross member section, the cross member section connecting the first post section and the second post section, the first post section and the second post section adapted to engage a vehicle seat;
    a bun moveably attached to the post assembly;
    a support structure positioned within the bun with the cross member mounted therein such that the support structure is moveable between an upright and tilted position, the support structure having a first support section and a second support section that are attached together; and
    an electrically powered drive mechanism comprising:
        a worm;
        an electric motor that rotates the worm in a clockwise or counter-clockwise direction;
        a spur gear that is driven by rotation of the worm, the spur gear being rotatably mounted on the first support section of the support structure;
        a first helical gear that is concentrically fixed to the spur gear; and
        a second helical gear fixed to the cross member such that rotation of the second helical gear in a first direction causes movement of the bun to a tilted position while movement of the second helical gear in a second direction causes movement of the bun to an upright position.

12. The head restraint assembly of claim 11 wherein the worm is a multi-start gear.

13. The head restraint assembly of claim 11 wherein the electric motor is actuated by a user operated switch.

14. The head restraint assembly of claim 11 wherein the electric motor is remotely actuated.

15. The head restraint assembly of claim 11 wherein the worm, the spur gear, the first helical gear, the second helical gear, and the electric motor are continuously engaged.

16. The head restraint assembly of claim 11 wherein the worm is angled with respect to the spur gear with an angle $A_1$, $A_1$ being equal to 90 degrees minus $A_2$ where $A_2$ is the angle between an axis of rotation for the worm and an axis of rotation for the spur gear, $A_1$ being from about 0 degrees to about 30 degrees.

17. The head restraint assembly of claim 11 wherein the electrically powered drive mechanism is attached to the first support section with a bracket.

18. The head restraint assembly of claim 11 wherein the electrically powered drive mechanism is attached to the first support section with a bracket element, the bracket element being formed in the second support section.

19. A head restraint assembly comprising:
   a post assembly including a first post section, a second post section, and a cross member section, the cross member section connecting the first post section and the second post section, the first post section and the second post section adapted to engage a vehicle seat;
   a bun moveably attached to the post assembly;
   a support structure positioned within the bun with the cross member mounted therein such that the support structure is moveable between an upright and tilted position, the support structure having a first support section and a second support section that are attached together; and
   an electrically powered drive mechanism comprising:
      a first gear;
      an electric motor that rotates the first gear in a clockwise or counter-clockwise direction;
      a second gear that is driven by rotation of the first gear, the second gear being rotatably mounted on the first support section of the support structure;
      a third gear that is concentrically fixed to the second gear; and
      a fourth gear fixed to the cross member such that rotation of the third gear in a first direction causes movement of the bun to a tilted position while movement of the third gear in a second direction causes movement of the bun to an upright position, the first gear being angled with respect to the second gear with an angle $A_1$, $A_1$ being equal to 90 degrees minus $A_2$ where $A_2$ is the angle between an axis of rotation for the first gear and an axis of rotation for the second gear, $A_1$ being from about 0 degrees to about 30 degrees, the first gear, the second gear, the third gear, fourth gear, and the electric motor being continuously engaged.

20. The head restraint assembly of claim 19 wherein the electric motor is actuated by a user operated switch.

* * * * *